United States Patent [19]

Knutson et al.

[11] Patent Number: 5,493,343
[45] Date of Patent: Feb. 20, 1996

[54] COMPENSATION FOR TRUNCATION ERROR IN A DIGITAL VIDEO SIGNAL DECODER

[75] Inventors: Paul G. Knutson, Indianapolis; Dong-Chang Shiue, Carmel, both of Ind.

[73] Assignee: Thomson Consumer Electronics, Inc., Indianapolis, Ind.

[21] Appl. No.: 365,721

[22] Filed: Dec. 28, 1994

[51] Int. Cl.$^6$ ........................................ H04N 5/16
[52] U.S. Cl. ........................... 348/691; 348/571; 348/607; 375/232
[58] Field of Search ........................... 348/571, 691, 575, 348/607; 375/229, 232, 235; 370/32.1

[56] References Cited

U.S. PATENT DOCUMENTS

| | | | |
|---|---|---|---|
| 3,699,326 | 10/1972 | Kindell | 235/175 |
| 4,236,224 | 11/1980 | Chang | 364/724 |
| 4,347,615 | 8/1982 | Ash | 375/14 |
| 4,562,553 | 12/1985 | Mattedi | 364/166 |
| 4,953,186 | 8/1990 | Levy et al. | 375/118 |
| 4,965,668 | 10/1990 | Abt et al. | 358/160 |
| 5,248,970 | 9/1993 | Sooch et al. | 341/120 |
| 5,386,239 | 1/1995 | Wang et al. | 348/472 |

Primary Examiner—Victor R. Kostak
Assistant Examiner—Juan Gabriel Acosta
Attorney, Agent, or Firm—Joseph S. Tripoli; Eric P. Herrmann; Ronald H. Kurdyla

[57] ABSTRACT

Compensation for offset errors caused by data truncation is accomplished by adding a compensation value to processed data in systems where the truncation stages are arranged in determinable configurations. More than one compensation value may be selected and applied. The selection of the appropriate value is determined by the number and type of truncation stages used in a given system configuration. The compensation value may be predetermined or measured.

13 Claims, 3 Drawing Sheets

COMPENSATION FOR TRUNCATION ERROR IN A DIGITAL VIDEO SIGNAL DECODER

FIELD OF THE INVENTION

This invention is related to the field of digital signal processing, and more particularly to digital filtering that may be employed in a television signal decoder, for example.

BACKGROUND OF THE INVENTION

Current terrestrial or satellite digital TV transmission channels are highly bandwidth constrained. This means that sophisticated modulation techniques must be employed to conserve bandwidth as much as possible. A common factor underlying the use of any of these sophisticated modulation techniques is the need to minimize noise and channel distortion in the TV receiver demodulation process. This is necessary in order to ensure accurate signal recovery. The need to minimize channel distortions in digital TV receivers often requires the use of equalization or deghosting networks. These networks usually employ digital filtering or other signal processing that involves numerous arithmetic multiplications. For example, coefficients of 'm' bits in length are multiplied by data of 'n' bits in length to produce data of 'm+n' bits in length. It is often impractical and expensive to use a data bus width of 'm+n' bits within the filter network. In practice, the data is usually truncated so that it is represented by fewer bits, and the least significant bits are discarded.

However, when data values are truncated, an average truncation error is introduced into the data. The average value of this error for a single truncation stage is equal to one half of the Least Significant Bit (LSB) of the truncated value. The truncation error appears as a DC bias in the resulting series of data values, and increases in proportion to the number of truncation stages that sequentially process the data. For instance, after "Y" truncation stages the resultant average DC offset component (hereafter termed the Offset Error) in the data is given by:

$$\text{Offset Error} = Y * LSB/2$$

where LSB is the Least Significant Bit of the truncated number.

This result assumes a constant scaling of data throughout the truncation stages. If truncations are performed at different scalings during processing, the Offset Error in the data is altered. Then the Offset Error equals the sum of the truncation errors at each stage. However, the truncation error at each stage equals the product of the LSB/2 truncation error multiplied by the appropriate scale factor at each stage.

The fact that the Offset Error is proportional to the number of truncation stages, assuming constant scaling, means that error accumulation occurs. Those systems performing a significant number of sequential truncations, such as TV receivers containing digital filters, are particularly susceptible to error accumulation. Error accumulation reduces the signal to noise ratio of the receiving system, which results in degraded receiver operation.

SUMMARY OF THE INVENTION

Apparatus in accordance with the principles of the present invention achieves cost-effective avoidance of signal degradation caused by truncation induced Offset Error. The apparatus also avoids the complexity, difficulty and cost of performing a rounding operation each time the data is truncated. In addition, the apparatus is particularly beneficial in consumer products such as advanced and high definition television receivers and related systems.

Apparatus according to the present invention compensates for error introduced by truncation in digital signal processing. The inventor has recognized that compensation for the Offset Error introduced into data as a result of one or more truncations can be achieved by adding a compensation value to the processed data. In a disclosed embodiment, the apparatus uses a control network to provide a DC offset compensation value which is added to processed data in order to accomplish the compensation.

More than one compensation value may be selected and applied. This may occur, for example, where the number of truncation stages is selectable in a configurable system. Then the compensation value used can be selected depending on the selected system configuration.

The compensation value to be used may be predetermined from a knowledge of the number and type of truncations occurring within the system, or it may be measured.

DETAILED DESCRIPTION OF THE DRAWINGS

Figure 1:
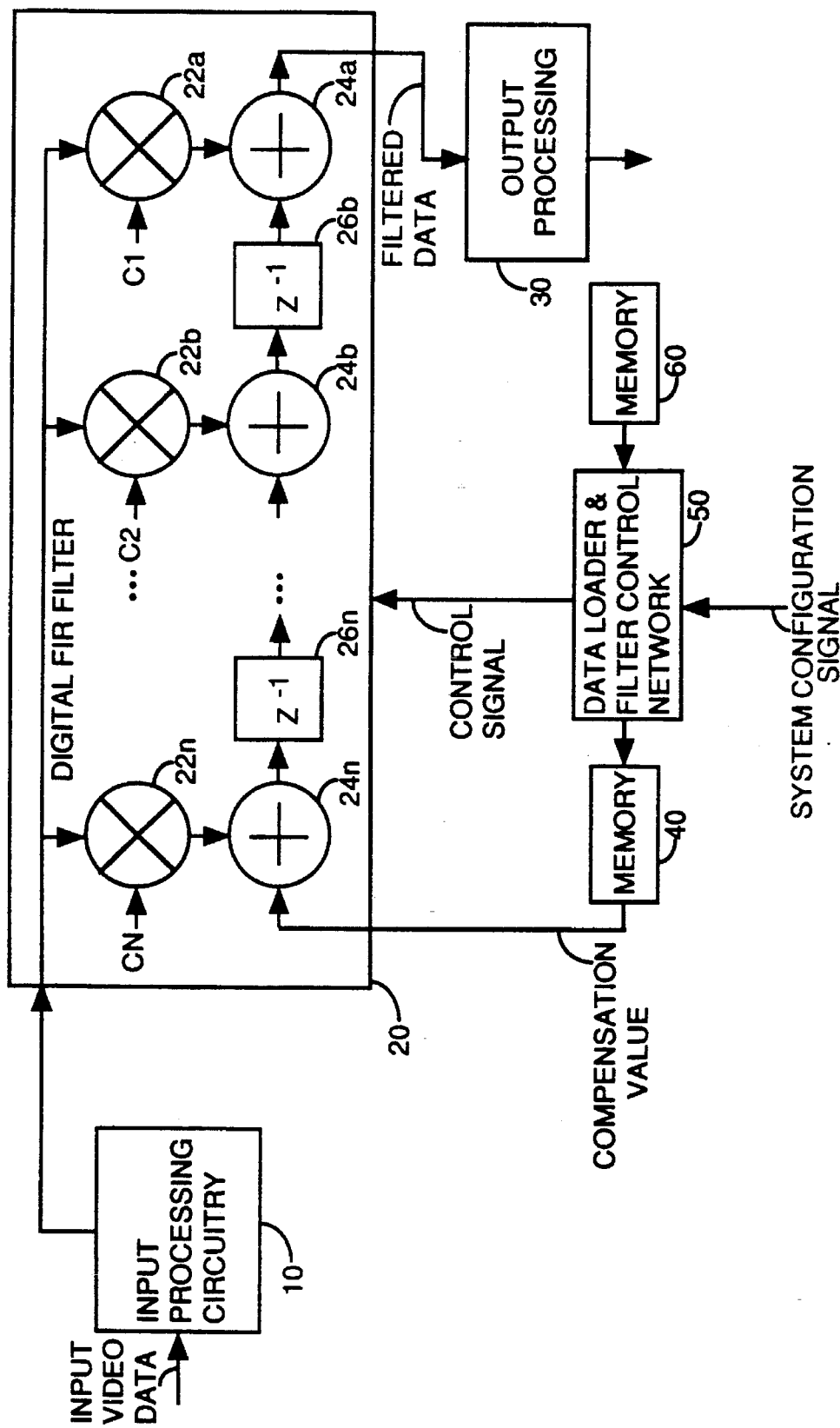
FIG. 1 is a block diagram including a digital filter employing the principles of the present invention.

FIG. 1 shows a digital processing system of the type that may be used in equalizer functions within advanced television receivers. A transmitted television signal is received and processed by an input processor 10 as will be described in connection with FIG. 3. Digital video data output from processor 10 is then further filtered by a digital signal filter 20. Filter 20 contains plural sections each composed of a multiplier (22), adder (24) and a delay (26) in the form of a Finite Impulse Response (FIR) filter. Truncations may occur, for example, at each multiplier element within filter 20.

Complex or real filter coefficients (CN ... C2, C1) of m bits in length are multiplied by data of n bits in length to produce data of m+n bits in length at the output of each multiplier. It is often impractical and expensive to use a data bus width of m+n bits within the filter. In practice, the data is often truncated so that it is represented by fewer bits, with the least significant bits being discarded to produce the truncated data.

However, if a series of data values are truncated, an average truncation error is introduced into the data. The average value of this error for a single truncation stage is equal to one half of the Least Significant Bit (LSB) of the truncated value. This average value results from the fact that the truncation error occurring at each stage is random, and lies between zero and one LSB of the truncated value. Therefore, the average value of the truncation error at each stage is one half of the LSB of the truncated value. This truncation error appears as a DC bias in the series of data values following truncation and increases in proportion to the number of truncation stages that sequentially process the data. For example, after "Y" truncation stages the resultant average DC offset in the data (Offset Error) is given by:

Offset Error=$Y*LSB/2$ where LSB is the Least Significant Bit of the truncated number.

This result assumes a constant scaling of data throughout the truncation stages. That is, the LSB of the truncated binary numbers represent the same value at each truncation stage. A variable scaling of data as opposed to a constant scaling of data may result, for example, from processing which employs shifts to effectively multiply or divide the data by factors of 2, 4, 8 . . . etc. Then the LSB of the truncated binary numbers may represent different values at each truncation stage. In this example the LSB of the truncated binary numbers could differ by factors of 2, 4, 8, . . . etc. Therefore, if truncations are performed at different scalings during processing, the Offset Error in the data is altered. Where the data scaling is not constant the Offset Error equals the sum of the truncation errors at each stage. However, the truncation error at each stage equals the product of the LSB/2 truncation error multiplied by the appropriate scale factor at each stage. The appropriate scale factor at a particular truncation stage is the factor by which the data at that stage is multiplied relative to the nominal (non-scaled) data. In the last example, the appropriate scale factor at a particular truncation stage would be the 2, 4, 8, . . . etc., factor used to multiply/divide the data relative to the non-scaled data.

The filtered data output of filter 20 at steady state contains the sum of the products of the input data and the various constant coefficients (CN . . . C2, C1). Therefore, the output data from filter 20 includes a summation of the truncation errors of each multiplier stage. Consequently, the filter 20 Offset Error is a result of truncation error accumulation and is proportional to the number of truncation stages, assuming constant scaling of the data at each truncation stage.

The inventor has recognized that compensation for this Offset Error in the output data of filter 20 can be achieved by adding a compensation value to the processed data. Further, since the Offset Error for which compensation is desired is a time-invariant DC signal with respect to both the filter 20 coefficients and the data processed in filter 20, the compensation value can be added anywhere in the signal processing path of filter 20. In FIG. 1, compensation for the Offset Error is performed by adding a DC offset compensation value (hereafter termed the Compensation Value) to the otherwise unused input of the adder element closest to the input within filter 20. Alternatively, for example, the addition of this value could be performed external to filter 20. In that case an external adder circuit could be arranged such that the Compensation Value is added to the input or output data of filter 20.

The Compensation Value that is added within filter 20 is provided by a memory 40, e.g. a register. Memory 40 may also be a RAM or any other storage device with read and write address capability. In one embodiment, the Compensation Value may be predetermined from a knowledge of the number and type of truncations occurring within filter 20. For example, assuming that filter 20 contains Y truncation stages and uses constant data scaling at each truncation, the Offset Error in the output data (Y*LSB/2) is stored in memory 40 in negative form to provide the Compensation Value. This Compensation Value is added to the processed data via input adder 24n to achieve compensation. The Compensation Value may be added to the processed data path at any point where there is a known gain relationship between the point of addition and the filter output. In FIG. 1, the point of addition, in adder 24n, has a constant unity gain relationship to the filter output, and there is a constant scaling of data during processing.

The magnitude of the Compensation Value depends on the number and scaling of the filter 20 truncation stages. Where different filter configurations with different numbers of truncation stages are possible, as in FIG. 1, different DC offset compensation values are required. In such a case, for example, a dataloader and filter control network 50 configures both the number of filter stages and the value of the coefficients used by filter 20. For this purpose network 50 generates a Control signal which determines the filter 20 configuration in response to a System Configuration signal. Control network 50 is preferably a programmed microprocessor which provides the Control signal as a discrete binary logic level output. This Control signal causes filter 20 to exhibit two different filter configurations, for example, which differ in the number of filter taps and in the value of the associated filter coefficients (CN . . . C2,C1). Each filter tap section is comprised of an adder (24), a delay (26) and a multiplier element (22) with an associated coefficient input to the multiplier element.

The switching between configurations of filter 20 may be accomplished by multiplexer devices. In response to the Control signal logic level, the multiplexers bypass predetermined sections of filter 20, routing input signals away from certain filter 20 sections and applying these re-routed signals to the inputs of other filter 20 sections. Multiplexers also respond to the Control signal to route different coefficient values (CN, . . . C2, C1) from a memory (not shown) to desired multipliers of filter 20. In this way, simple multiplexer switched signal routing achieves different filter configurations. Because the two selectable filter configurations differ in the number of multipliers involved, for example, the configurations also differ in their number of truncation stages. This means a different Compensation Value is required for each configuration.

Control network 50 determines the filter 20 configuration by means of the Control signal and also loads memory 40 with the Compensation Value that is compatible with the filter 20 configuration. Control network 50 performs these functions in response to a System Configuration signal, which may be provided as a binary logic level input signal to control network 50 from a programmed external microprocessor (not shown). The System Configuration signal itself may be determined, for example, by sensing the way the input signal to filter 20 has been modulated. Such modulation may include variations of Pulse Amplitude Modulation (PAM) including Quadrature Amplitude Modulation (QAM), Vestigial Sideband Modulation (VSB) and Quadrature Phase-shift Keying (QPSK), as known. The System Configuration signal may additionally be determined, for example, by the type of channel distortion occuring within the apparatus.

Control network 50 reads the appropriate Compensation Value associated with the selected filter 20 configuration from memory 60, then loads that value into memory 40. Memory 60 is capable of storing more than one Compensation Value and may be, for example, a RAM associated with a microprocessor within control network 50. In this example two different Compensation Values may be provided in response to the binary (two-level) status of the System Configuration signal. Each value is respectively associated with a selected filter 20 configuration.

The filtered, error-compensated output of filter 20 is processed by output processor 30 which may incorporate a variety of functions. In the context of a digital TV receiver, for example, those functions may include descrambling, and decoding functions as will be described in connection with FIG. 3.

Although the FIG. 1 preferred embodiment shows a method for compensating more than one filter configuration, a simpler implementation is possible. Where only one predetermined filter configuration is involved, a single predetermined Compensation Value is stored in memory 40 and both control network 50 and memory 60 are not required. The other elements of FIG. 1 and their associated functions remain the same as previously described.

Another variation of the FIG. 1 embodiment may occur when the Compensation Value is chosen in order to compensate for a DC shift caused by functions other than truncation stages. For example, function blocks introducing DC offsets equal to LSB/4 or 2LSB could be compensated by adding −LSB/4 and −2LSB values respectively to the processed data by the methods described above.

Figure 2:
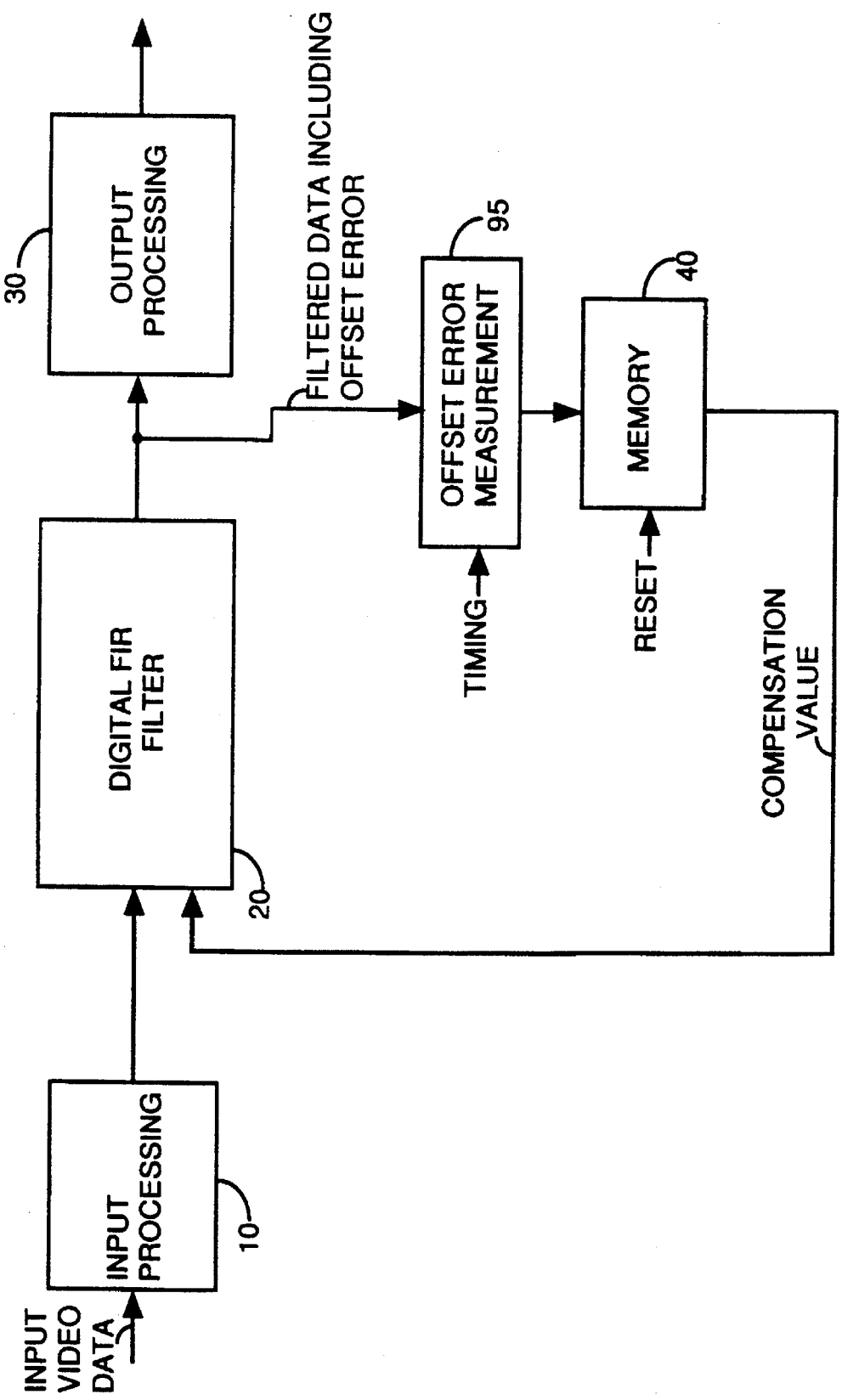
FIG. 2 shows apparatus according to the invention for measuring truncation induced Offset Error in processed data.

Another embodiment of the invention is shown in FIG. 2. In FIG. 2 the DC offset compensation value is obtained by measurement. In FIG. 1 in contrast, the DC offset compensation value is predetermined from a knowledge of the system configuration, in particular, from the number and type of truncations occurring during signal processing. FIG. 2 includes an Offset Error measurement network 95 which is absent from FIG. 1. However, input processor 10, filter 20, output processor 30 and memory 40 in FIG. 2 correspond to similarly labeled networks in FIG. 1.

In FIG. 2 as in the embodiment of FIG. 1, digital video data from an input processor 10 is filtered by digital signal filter 20. The filtered output of filter 20 is further processed by output processor 30. However, in FIG. 2 the filter 20 output signal is also passed to measurement network 95. This is to enable network 95 to measure the Offset Error in the filter 20 output signal. Network 95 also derives the negative value of the Offset Error and stores this value as the Compensation Value in memory 40. The Compensation Value is added to data within filter 20 to provide compensation in the same manner as was described earlier in connection with the embodiment of FIG. 1.

Before measuring the Offset Error, the Compensation Value stored in memory 40 is first set to zero. This ensures that the Offset Error to be measured is not affected by any previous Compensation Value stored in memory 40. If the filtered output data itself contained a DC component, then the Compensation Value may be set to the negative value of this expected DC component. Then the filter 20 output only contains the Offset Error introduced by filter 20 processing. This would ensure that only the DC component introduced by filter 20 was measured, as is desired. This initialization procedure is performed in response to a memory Reset signal as shown in FIG. 2. The Reset signal is provided by a control network such as a programmed microprocessor (not shown), in response to a power-up system reset, for example. The Compensation Value output may be provided only upon occurrence of the Reset signal. Alternatively, the Compensation Value may be provided periodically based on a periodic measurement, depending on the requirements of a particular system.

Next, the filter 20 output signal containing the Offset Error is low pass filtered by network 95 to provide a DC value that approximates the Offset Error. The low pass filtered signal is then sampled to provide the measured Offset Error. The sampling is performed after sufficient time has elapsed from the start of the measurement to assure adequate stability and accuracy of the sampled value. The timing of the sampling is determined by a Timing signal as shown in FIG. 2. The Timing signal is provided by a control network such as a programmed microprocessor (not shown), in response to a power-on condition, and may be derived from the Reset signal, for example. In such case the Timing signal may be provided by the microprocessor following a programmed time delay after the appearance of the Reset signal. Other methods to obtain a measured Offset Error are possible. These include, for example, employing a programmed microprocessor to compute the Offset Error from a series of data values. This computation consists of taking the arithmetic average of a sufficiently large series of data values in order to approximate the DC offset value of the data, as known.

Network 95 then derives the negative value of the measured Offset Error and stores this value as the Compensation Value in memory 40. Finally, the Compensation Value is added to the processed data by filter 20 to achieve compensation in the manner previously described in connection with FIG. 1.

Figure 3:
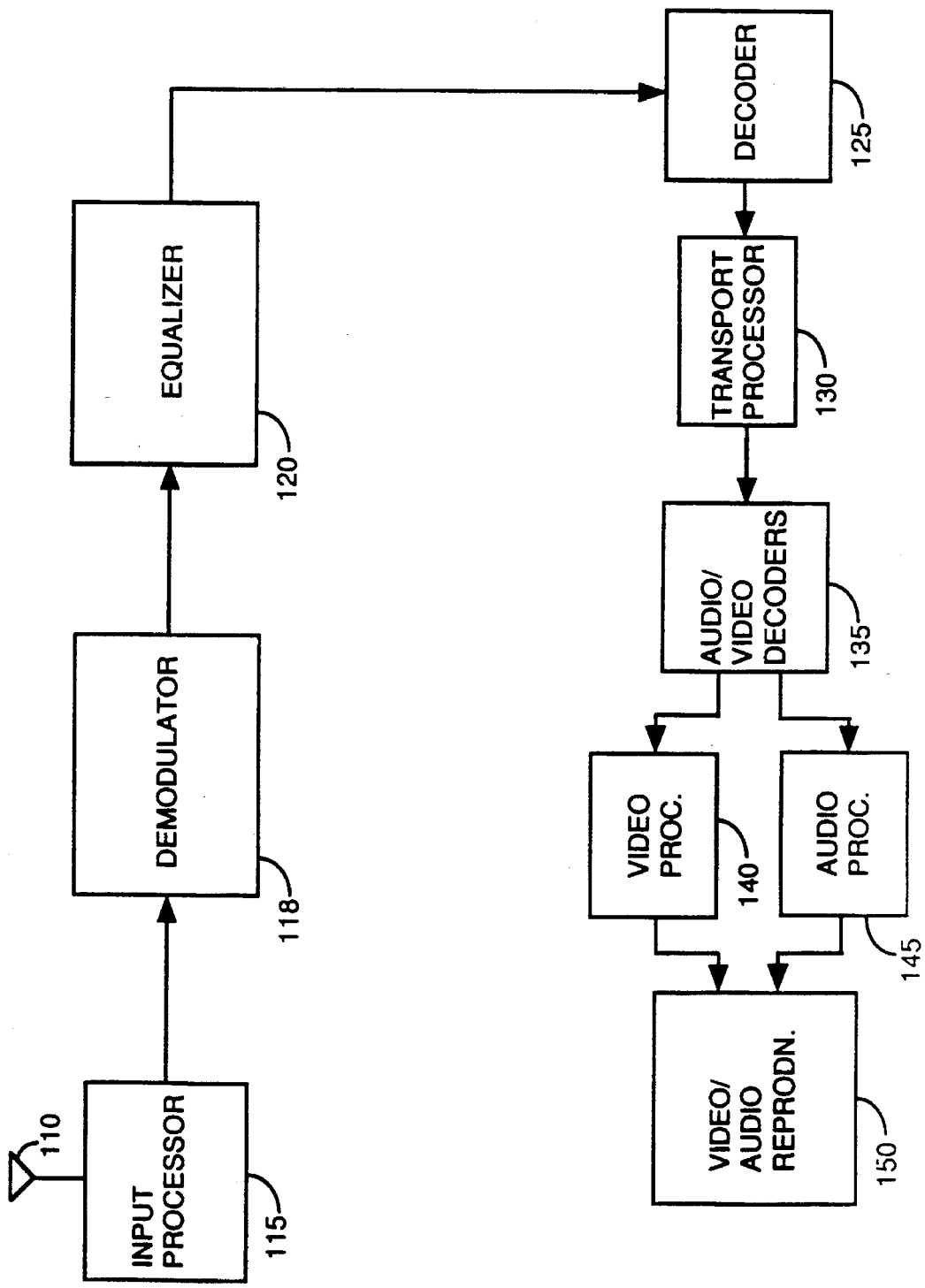
FIG. 3 is a block diagram of a portion of an advanced television receiver including an equalizer which may employ the principles of the present invention.

The described methods for compensating for truncation errors are of particular advantage in a system for equalizing a Pulse Amplitude Modulated (PAM) signal such as a Quadrature Amplitude Modulated (QAM) signal. Such a signal is defined by a constellation of symbol points arranged in a grid-like pattern on a real-imaginary plane, as known. FIG. 3 incorporates an equalizer of this type as will be discussed. Compensation for truncation errors by the described methods reduces random orbital errors associated with individual constellation points.

FIG. 3 is a block diagram of a portion of an advanced TV receiver including an equalizer network 120 which may employ a filter in accordance with the principles of the present invention. A transmitted TV signal received by an antenna 110 such as a QAM signal, is applied to an input processor 115. Input processor 115 typically includes a tuner and IF stage for down-converting the received signal to a lower frequency band. It also may include automatic gain control, filtering and timing/clock recovery networks, for example. These functions are well known and are described, for example, in the reference text *Digital Communication*, Lee and Messerschmidt (Kluwer Academic Press, Boston, Mass., U.S.A., 1988).

The output signal from unit 115 is demodulated by unit 118 to recover the baseband data from the modulated input signal. The demodulated output data is then equalized and digitally filtered by equalizer 120. The purpose of this is to compensate for distortions in the data channel as well as to reduce noise and interference, as known. Data is truncated during processing both within the digital filter multiplier elements and at other processing stages within unit 120. DC offset compensation is applied to equalizer unit 120 in accordance with the principles of the invention as described in connection with FIG. 1. Other system configurations of the elements shown in FIG. 3 are also possible. For instance, a system configuration may position the equalizer unit before the demodulator.

The demodulated, equalized and DC offset compensated output data from unit 120 is decoded by means of decoder 125, which may be a Reed-Solomon decoder, for example. The corrected data packets from unit 125 are then applied to a transport processor 130, which examines the header of each data packet to identify audio and video data. Transport processor 130 conveys the audio and video output data to appropriate decoders within unit 135. Decoded audio and video signals from unit 135 are respectively applied to an audio processor 145 and to a television video processor 140. Processors 145 and 140 format the audio and video signals in a manner appropriate for reproduction by unit 150.

Although the invention has been described in the context of an advanced TV video signal processing system, it should be understood that the principles of the invention are generally applicable to digital signal processing in which truncation occurs. Similarly, when applied to a TV receiver, the DC offset compensation is not limited to the equalizer function but can be applied to other functions within the TV receiver, such as the demodulator for example. Also, memory 60 of FIG. 1 may have to store several Compensation Values if compensation is required for several different filter configurations.

What is claimed is:

1. In a system including a digital signal processing network having a signal path with a plurality of data truncation stages for processing an input signal, said truncation stages each subject to exhibiting a DC offset truncation error, apparatus comprising:

means for producing a DC offset compensation value (Compensation Value) as a function of accumulated DC offset truncation errors (Error), said Error being a function of the number of said truncation stages; and means for adding said Compensation Value to said signal path to reduce the value of said Error.

2. Apparatus according to claim 1, wherein said Error is further a function of the scale factor of data at each truncation stage, said scale factor being the factor by which data at each truncation stage is multiplied relative to nominal, non-scaled data.

3. Apparatus according to claim 1, wherein said producing means includes a first memory for storing said Compensation Value.

4. Apparatus according to claim 1, wherein said adding means is an element of said digital signal processing network.

5. Apparatus according to claim 3, wherein said producing means further includes a control network for providing one of a plurality of Compensation Values to said first memory in response to a system configuration control signal.

6. Apparatus according to claim 5, wherein said producing means further includes a second memory for storing said plurality of Compensation Values; and said control network transfers said provided Compensation Value from said second memory to said first memory in response to said control signal.

7. Apparatus according to claim 3, wherein said producing means further includes means for measuring the value of said Error to produce an output measured value.

8. Apparatus according to claim 7, wherein said measuring means further provides said Compensation Value as an output with a value approximately equal to the negative of said measured value.

9. Apparatus according to claim 4, wherein said digital signal processing network comprises a filter for equalizing said input signal; and said input signal is a Pulse Amplitude Modulated signal defined by a constellation of symbol points.

10. Apparatus according to claim 9, wherein said Pulse Amplitude Modulated signal contains television video data.

11. Apparatus according to claim 1, wherein said signal path is a video signal processing path further connected to a video signal decoder and a video signal reproduction device.

12. In a system including a digital signal processing network having a signal path with a plurality of truncation stages each subject to exhibiting a DC offset truncation error such that said signal path is subject to exhibiting an accumulated DC offset truncation error (Error), apparatus comprising:

a first memory for storing a DC offset compensation value (Compensation Value);

a second memory for storing a plurality of predetermined Compensation Values;

means for transferring a Compensation Value from said second memory to said first memory in response to a system configuration control signal for selecting one of said plurality of predetermined Compensation Values; and a digital filter network in said signal processing network including a multiplier, an adder and a delay element, wherein an output of said multiplier is coupled to an input of said adder and an output of said adder is coupled to said delay element, wherein said adder adds said selected Compensation Value to said signal path to reduce the value of said Error.

13. In a system including a digital signal processing network having a signal path with a plurality of data truncation stages for processing an input signal, said plurality of truncation stages subject to exhibiting an accumulated DC offset truncation error (Error), apparatus comprising:

means for modifying the configuration of said digital signal processing network including the number of said truncation stages in response to a system configuration control signal;

means for producing a DC offset compensation value (Compensation Value) in response to said system configuration control signal; and means for adding said Compensation Value to said signal path to reduce the value of said Error.

\* \* \* \* \*